Dec. 23, 1969                J. D. BOHANNON                3,485,025
                      MECHANICAL CITRUS FRUIT HARVESTER
Filed Dec. 9, 1966                                       4 Sheets-Sheet 1
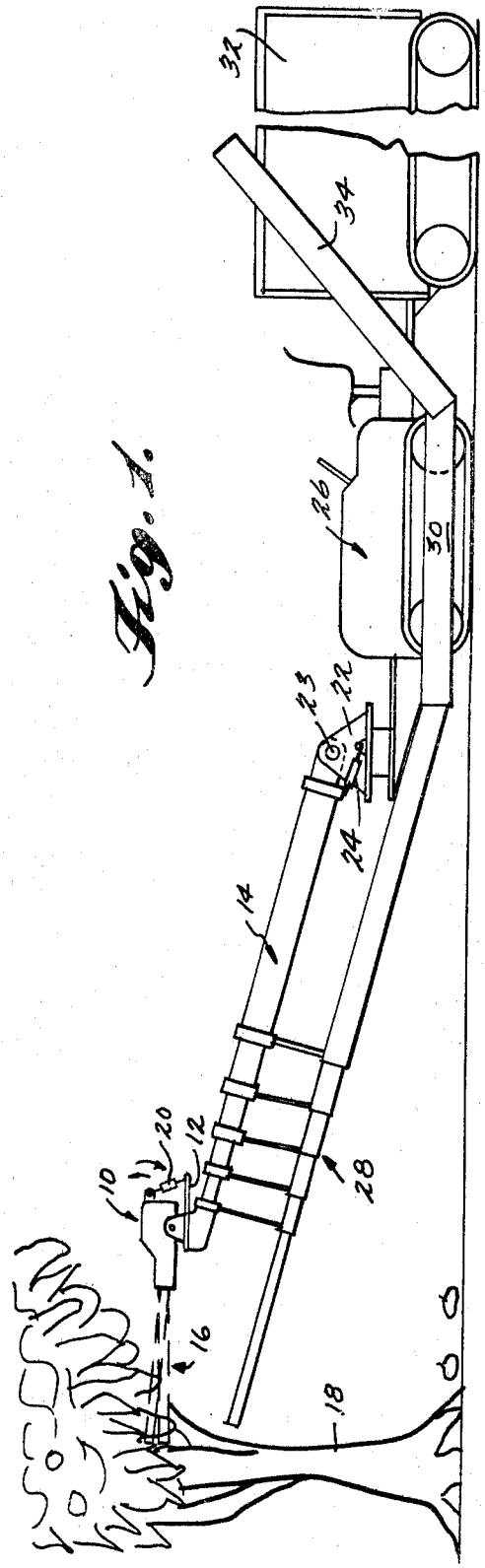
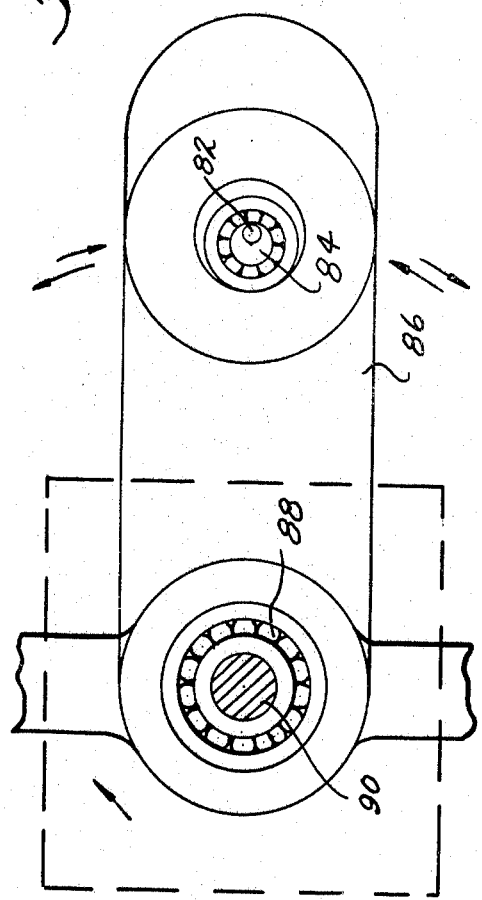
INVENTOR.
JOHN D. BOHANNON
BY
Cushman, Darby & Cushman
ATTORNEYS Dec. 23, 1969   J. D. BOHANNON   3,485,025
MECHANICAL CITRUS FRUIT HARVESTER Filed Dec. 9, 1966   4 Sheets-Sheet 2

INVENTOR.
JOHN D. BOHANNON
BY
Cushman, Darby & Cushman
ATTORNEYS

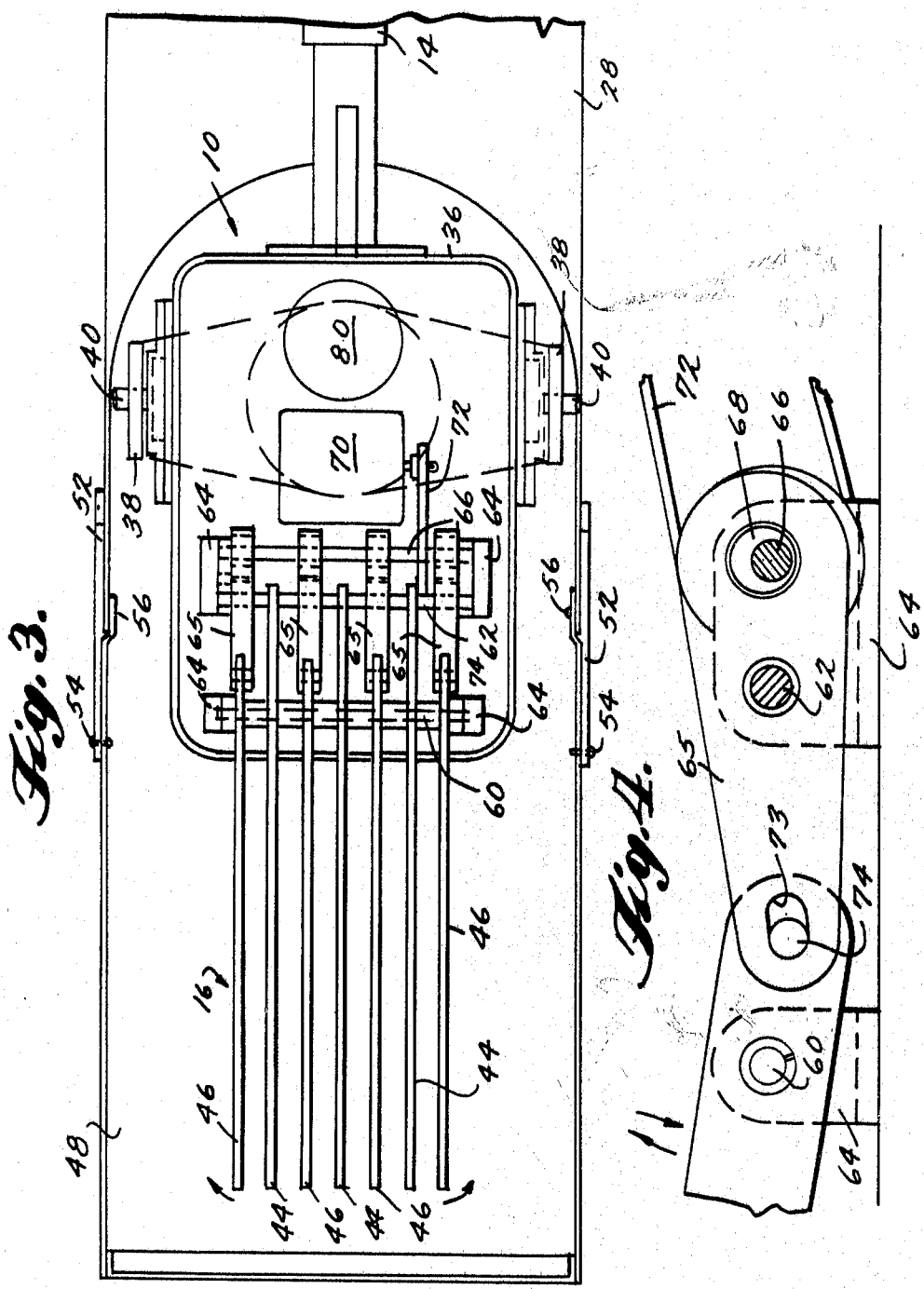

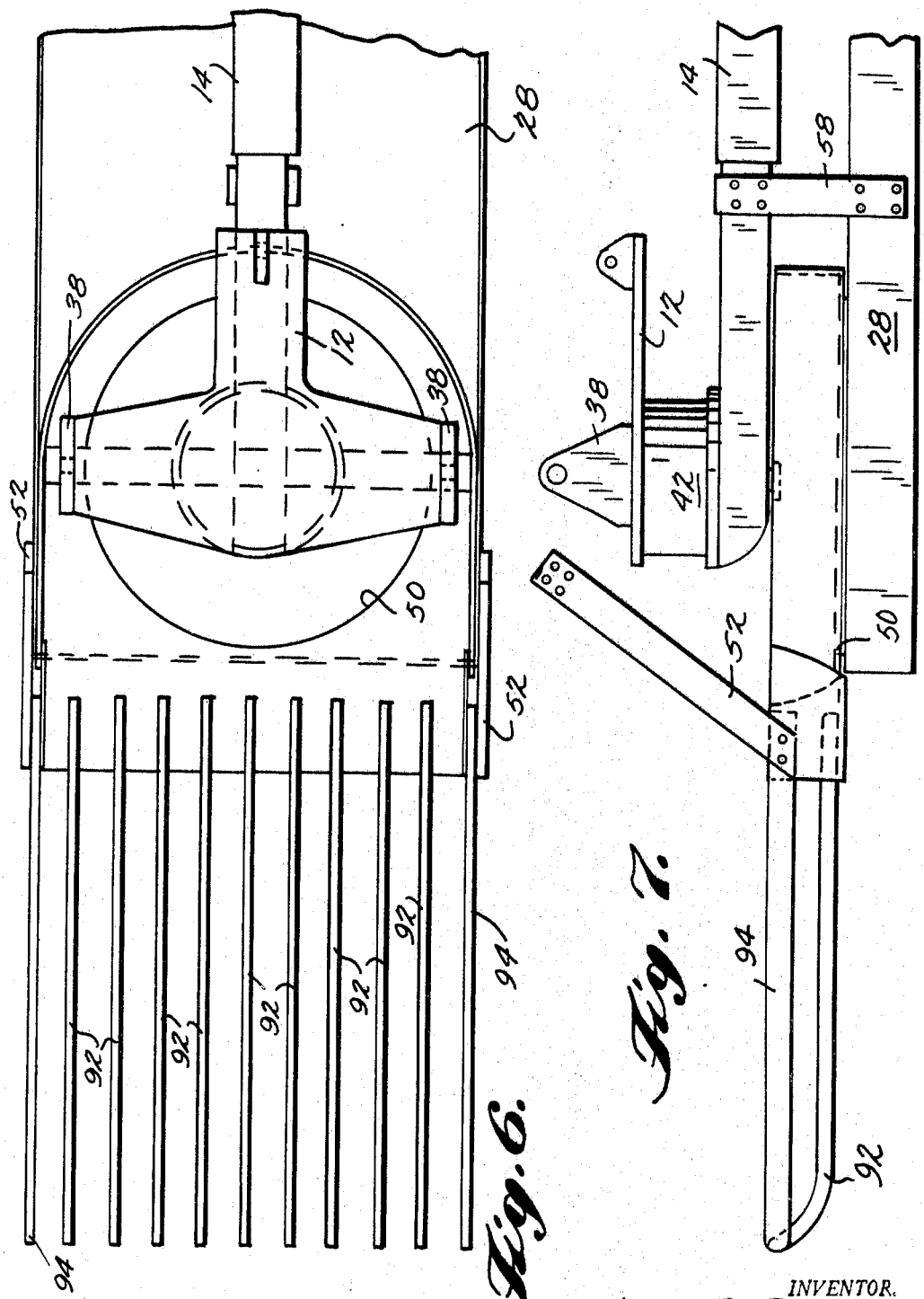

United States Patent Office

3,485,025
Patented Dec. 23, 1969

3,485,025
MECHANICAL CITRUS FRUIT HARVESTER
John D. Bohannon, 3074 NW. 18th. St.,
Miami, Fla. 33125
Filed Dec. 9, 1966, Ser. No. 600,439
Int. Cl. A01g 19/00
U.S. Cl. 56—328                                12 Claims

ABSTRACT OF THE DISCLOSURE

A citrus fruit harvester is provided with a unit having a plurality of vibrating fingers for contacting upper surfaces of citrus fruit which is to be removed from a tree. The individual fingers have edges which are scalloped, or serrated, so as to present indentations which contact the curved surfaces of ripe fruit. The fingers may be vibrated vertically and laterally while in contact with fruit in a tree.

---

This invention relates to a harvester for harvesting fruit from trees, and specifically, the invention is concerned with an improved harvester for removing and collecting citrus fruit from trees.

Up to the present time, the citrus fruit industry has depended largely upon manual labor for harvesting fruit from trees. Such hand labor has offered the benefit in past years of a low cost, economical method for harvesting fruit; however, this benefit has been lost in present day markets where labor costs have become high and labor itself has become unavailable or unreliable in its availability. Therefore, the citrus fruit industry has been seeking a mechanized apparatus which will effectively and efficiently harvest ripe citrus fruit from trees without damage to the fruit or the tree from which it is removed.

A wide variety of fruit harvesting mechanisms have been designed and attempted, but none have been satisfactory for meeting the requirements of the citrus industry. For example, it is known to remove fruit from trees by mechanisms which shake the tree by gripping a lower portion of the tree, by wind devices which attempt to blow ripened fruit from a tree, and by flailing devices which try to remove fruit by striking into a tree and removing individual fruits by the striking action. It is also known to remove fruit by the use of rotating spindles which carry paddles for striking fruit from its stems, and other attempts have included combing devices which move upwardly into a tree and outwardly therefrom to pull fruit away from tree branches by a plurality of rotating spindle fingers. All such devices have been unsuccessful largely because of the resulting damage to trees and to fruit when such devices are used in a harvesting operation. The usual damage which has been noticed is a tearing of large segments of stems or branches from the fruit tree, and also, it is common for stems to be severely torn out of the fruit so as to remove a portion of the fruit core or its outer shell.

In accordance with the present invention, it has been found that citrus fruit can be safely and gently removed from trees by a harvesting unit which contacts upper surfaces of the fruit and gently vibrates the fruit from its normal hanging position on a stem. With the present invention, severe forces are avoided, and there is no grappling or pulling of a fruit from a tree as has been attempted with prior devices.

The harvesting unit of the present invention is constructed to provide a plurality or set of closely spaced fingers which can be moved into a tree for engaging upper surfaces of fruit clusters within the tree. The plurality of fingers are vibrated in vertical and horizontal planes so as to provide a gentle application of vibratory force to upper surfaces of fruit contacted by the fingers. Further, the fingers include special configurations for their fruit contacting edges so as to impart reciprocatory vibrations about the fruit stems. Such vibrations, when applied at a rapid frequency, quickly weaken the connection of a stem to an individual fruit and the fruit is quickly released from its stem. It has been found that a relatively high frequency of vibration for contacting upper surfaces of fruit results in a very gentle and rapid removal of fruit from its stems. In the detailed description of this invention, the harvesting unit will be described with particular reference to separate means for providing separate vibratory movements to the plurality of fingers. Also, it is preferred that intervening fingers of the set remain vertically stationary while only alternating fingers apply a vertical vibratory force to fruit contacted by all of the fingers. In this manner, the stationary fingers serve to initially contact and position an individual fruit while it is being vibrated by vertically vibrating intervening fingers. A preferred range of vibrations for both horizontal and vertical vibratory movements will be discussed in the description which follows.

The harvesting unit of this invention may also include a novel collecting means to remove harvested fruit from the confines of a tree for ultimate conveyance to a collection receptacle. In this manner, fruit is contacted, gently removed from its stem, and conveyed to a suitable large receptacle; and hand labor or additional steps of harvesting are kept to a minimum.

These and other features of the present invention will become apparent in the more detailed discussion which follows, and in that discussion reference will be made to the accompanying drawings in which:

FIGURE 1 is a side elevational view of a harvesting unit of this invention together with associated equipment. The apparatus is shown harvesting a fruit tree in accordance with the inventive concepts of this invention;

FIGURE 3 is a top plan view of the harvesting unit of FIGURE 2;

FIGURE 4 is an enlarged side elevational view of a mechanical linkage between a power means and harvesting fingers of the harvesting unit, particularly showing how vertical movement is imparted to the harvesting fingers;

FIGURE 5 is an enlarged top plan view of a second linkage, taken along line 5—5 of FIGURE 2, and showing a linkage which imparts horizontal movement to the harvesting unit;

FIGURE 6 is a top plan view of a collecting means specifically constructed and adapted to be used with the harvesting unit of this invention; and FIGURE 7 is a side elevational view of the collecting means shown in FIGURE 6.

Figure 2:
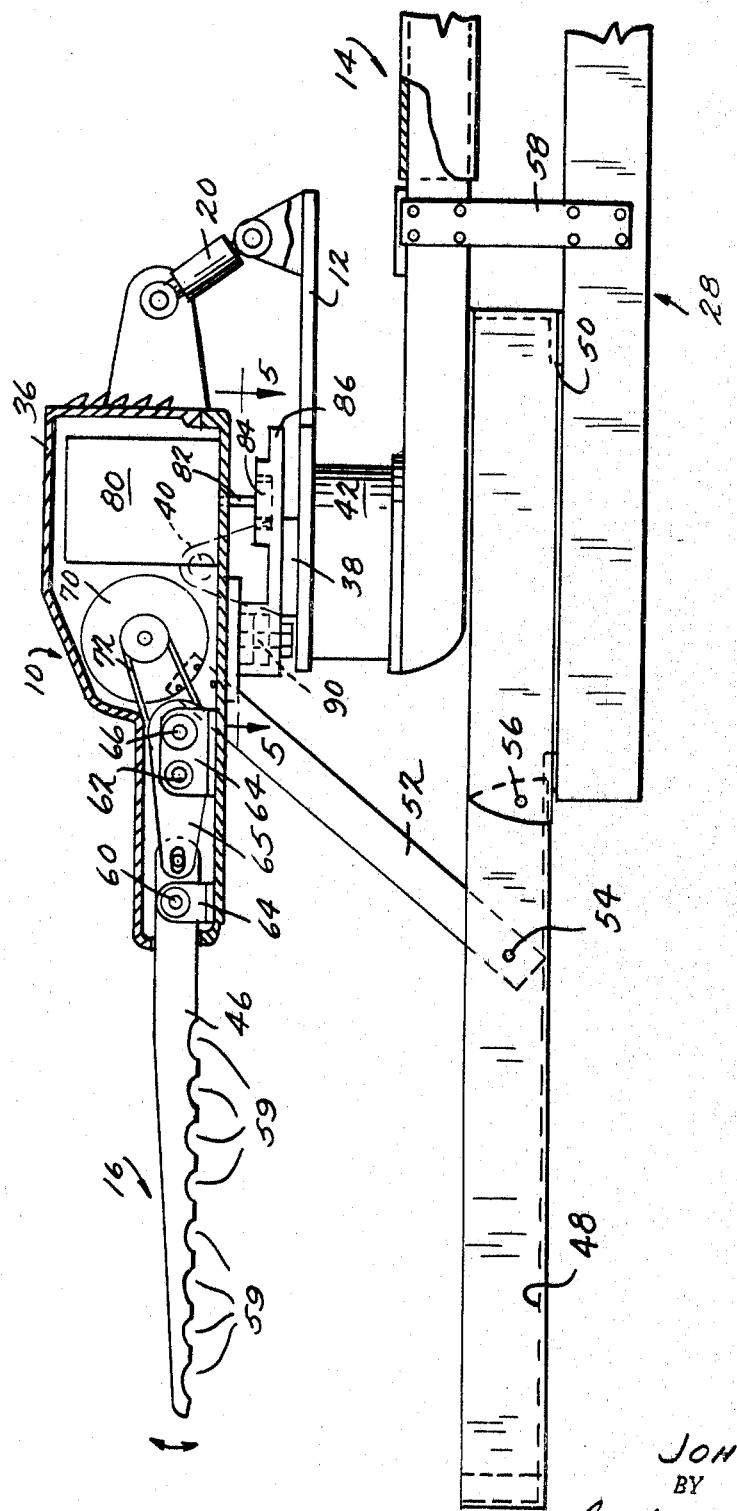
FIGURE 2 is a side elevational fragmentary view of the harvesting unit, shown in an enlarged scale with portions broken away and shown in section, and showing harvesting fingers and a collecting means associated therewith.

Referring to FIGURE 1, which illustrates a longitudinal side view of a harvesting unit of this invention together with associated equipment, the harvesting unit or working head 10 is shown mounted on a support platform 12 at the end of a telescopic boom arm 14. A set of harvesting fingers 16 projects horizontally from the harvesting unit 10 for engaging and removing ripened fruit contained within a tree 18. The harvesting fingers 16 are moved in rapid vertical and horizontal vibrations by motor means located within a housing of the harvesting unit 10, as will be explained hereinafter. The fingers 16 can be made of a metal, such as aluminum, or of a hard rubber or synthetic plastic material. Connected between the back end of the harvesting unit 10 and the support platform 12 is a hydraulic ram device 20 which can be operated to tilt the harvesting unit 10 and its projecting harvesting fingers 16 about a horizontal axis to any desired angle of approach, depending upon the size and height of the tree and the particular location of the fruit on the tree.

The hydraulically operated telescoping boom 14 is of any well known construction and does not form a separate part of the present invention. However, the boom is made up of a number of sections which can be telescoped one within another, and means are provided for extending or retracting the boom segments so as to make the boom longer or shorter. A base end of the boom is mounted on the platform 22 for movement about a horizontal axis at 23. Such movement of the boom is provided by a hydraulic ram means 24. The platform 22 may be mounted at the front end of a tractor vehicle 26, which is of any well known construction and is adapted for being self-propelled in and among trees in a fruit grove. The platform 22 may also be mounted to swing about a vertical axis, and any conventional journaling means may be provided for permitting swinging movements of the boom 14 about a vertical axis of the platform. In the apparatus shown in FIGURE 1, there is also provided a telescoping chute or fruit trough 28 which is connected to and movable with the telescoping sections which make up the boom 14. The chute 28 is of a construction to receive fruit from the tree 18 as it is removed by the harvesting unit 10, and the fruit can then roll down the telescoping chute 28 to a conveyor means 30 which is carried alongside of the tractor 26. A receiving receptacle or bin 32 may be drawn behind the tractor 26, and a separate conveyor 34 may be provided for lifting removed fruit from the conveyor 30 and into the bin 32. Although no specific construction has been shown for the conveyor means associated with the harvesting unit of this invention, it is to be understood that any known system may be utilized in association with the harvesting unit to convey and collect fruit removed thereby.

The general operation of the harvesting apparatus shown in FIGURE 1 includes a movement of the apparatus into the vicinity of a fruit tree to be harvested. The harvesting unit 10 is moved, by suitable control means (not shown) associated with the hydraulic equipment, into the confines of a fruit tree so that the harvesting unit can be slowly lowered through the tree for contacting clusters of fruit with the set of vibrating fingers 16. Although it is preferred to start at the top of a tree and work downwardly, it is to be understood that the harvesting unit 10 can be placed into a tree at any desired level and then worked downwardly onto the upper surfaces of fruit clusters for gently removing the fruit from the clusters. When the harvesting unit 10 has been moved into the confines of the tree, the set of fingers 16 is vibrated in a special manner to be described in greater detail below, and fruit is contacted by the rapidly vibrating fingers. The contact of the vibrating fingers with ripe fruit causes a quick removal of the fruit from its stem, and then the fruit drops downwardly into a collecting means at the receiving end of the chute 28. From there the removed fruit rolls down to the conveyor 30 and is then lifted up into the bin 32 by the separate conveyor 34. The operation is continued, and the harvesting unit 10 is moved through the tree until all of the fruit crop is removed. With the apparatus which has been illustrated in FIGURE 1, it is possible to harvest approximately 400 to 500 boxes of fruit per day with a single operator.

The invention will now be discussed with particular reference to the harvesting unit 10 which is constructed in a novel manner to efficiently and effectively remove a ripe citrus fruit crop from a tree. Referring to FIGURES 2 and 3, it can be seen that the harvesting unit 10 includes a housing 36 from which a plurality of closely spaced fingers 16 extend. The housing contains means for vibrating the fingers in both horizontal and vertical planes, and the entire housing, with its associated structures, is mounted on the platform 12. Upright supports 38 are fixed on opposite sides of the platform 12 for receiving horizontal mounting shafts 40 which extend through the supports and into side walls of the housing. This mounting arrangement permits tilting movements of the entire housing unit relative to the platform 12, and as already discussed, a ram 20 may be provided for tilting the harvesting unit about a horizontal axis at 40. The platform 12 together with the harvesting unit 10 connected thereto may be further mounted to swivel about a journal means 42 so as to provide swinging movement of the harvesting unit about a vertical axis. Hydraulic ram devices of known construction may be used for rotating or swinging the harvesting unit 10 about the vertical axis, but such devices have been omitted from the drawings for clarity.

The portion of the harvesting unit 10 which actively contacts and removes fruit from a tree includes the set of fingers 16. The fingers are illustrated in FIGURE 3, as being seven in number, although a different number of fingers may be utilized in a preferred construction. Of the seven illustrated fingers, three are mounted in a fixed relationship to the housing, while four of the fingers are mounted to be vertically vibrated relative to the housing. The three stationary fingers 44 are alternated with the positions of the four movable fingers 46. In this way, there is provided a set of fingers which includes intervening fingers which are stationary and alternate fingers which may be vertically vibrated relative to the intervening fingers. The means for applying vertical vibratory movements to the intervening fingers 46 will be discussed in greater detail below, but generally, a motor means is provided for applying relatively rapid vertical vibrations to the fingers 46 so as to apply rapid reciprocations to a fruit about its stem. In addition to the vertical vibrations which can be applied to the alternate fingers 46, all of the fingers 44 and 46 of the entire set 16 are vibrated in a horizontal plane by a separate power means contained within the housing 36. Thus, all fingers may be vibrated in a horizontal plane while only alternate fingers are rapidly vibrated in a vertical plane. The combined vibrations of the fingers result in an improved and more rapid removal of fruit from a tree, and it has been found that fruit is removed with little or no damage to the individual fruit or to the tree itself.

FIGURES 2 and 3 also illustrate one form of a collecting means which may be associated with the harvesting unit 10. The illustrated collecting means includes a relatively large pan 48 which is carried or mounted at the end of the collecting trough 28. The pan 48 and the collecting trough 28 are associated with the extensible boom 14 in the manner described for FIGURE 1. The pan 48 is of a sufficient length and width to receive all fruit which is removed by the vibrating set of fingers 16, and the removed fruit then rolls downwardly from the pan 48 into the chute 28 for ultimate conveyance into the bin 32. Also, an end portion of the pan 48 may be coated with or formed from rubber so as to avoid any damage to a tree into which the pan is inserted. When the pan 48 is constructed as shown in FIGURE 2 so as to overlap a terminal end portion of the trough 28, there is provided a passageway 50 between the pan and the trough 28, so that fruit can fall downwardly into the trough. Of course, it is contemplated that the collecting pan 48 may be coextensive with a terminal end of the trough 28, and such an arrangement is shown generally in the FIGURE 1 view. The collecting pan 48 of FIGURE 2 is also connected to the housing of the harvesting unit 10 by a bracket means 52 which is pivotally connected to the pan 48 at 54. The bracket 52 maintains an outer portion of the pan 48 in substantially parallel alignment with the harvesting unit 10 for all of the tilted positions of the harvesting unit. In order that the outer portion of the pan 48 may move relative to an inner portion of the pan and the chute 28, a pivotal connection is provided at 56 between the pan sections. A bracket 58 is shown as a connecting link between a segment of the extensible boom 14 and the trough or chute 28. Similar brackets are located between the boom and the trough for each of the telescoping segments of the boom 14, and thus, a provision is made for telescoping the trough 28 in a direct relationship to the telescoping movements of the boom 14. Of course, it is understood that the trough 28 is made up of separate segments which can be telescoped relative to one another in the same manner as described for the boom 14. An alternative collecting means will be discussed with reference to FIGURES 6 and 7.

The individual fingers 44 and 46 which make up the set of fingers 16 are illustrated in FIGURE 2 as having serrations or crenulations 59 formed in their lower edges. The serrations 59 are individualy formed to approximate the upper shapes of fruit of the type which is to be harvested. The contours of the individual serrations permit an embracing of the upper rounded surfaces of fruit by the lower edges of two or more of the fingers 44 and 46 which may contact the fruit upon operation of the harvesting unit 10. It is a further feature of the present invention that the serrations 59 of adjoining fingers are formed with slightly different contour patterns in order to provide a novel action on the surfaces of fruit contacted by the set of fingers. It has been found that the serrations may be individually formed with the contour of a circle segment, and a series of circle segments may be positioned along the bottom edge of an individual finger to form the serrated or scalloped effect which is shown. In a preferred arrangement, the circle segments 59 of the stationary fingers 44 are of dimensions which are smaller than corresponding circle segments 59 formed in the moving fingers 46. Further, the serrations along the stationary fingers 44 may be more closely spaced than the serrations along the moving fingers 46. By providing the described relationship of differing serration patterns between adjoining fingers, it is possible to cause an individual fruit to be positioned by the stationary fingers while it is being vibrated and rapidly reciprocated on its stem by the vibrating fingers 46. Since the vibrating fingers 46 move up and down in vertical planes for short distances, the larger curvatures of their serrations permit a greater flexing of an individual fruit back and forth and up and down relative to such fingers as compared to the stationary fingers. Also, the differing patterns of curvature for the serrations of adjoining fingers provide for a slightly offset relationship between serrations of adjoining fingers, and this results in a slight rotational reciprocation being applied to an upper surface of a fruit for rapidly twisting the fruit back and forth about its stem axis. This motion coupled with the vertical vibratory reciprocations which are applied to the fruit result in a rapid weakening of the fruit stem at its point of attachment to the fruit. This rapid weakening results in an easy removal of the fruit from its stem and without any damage to the fruit itself or to the branch upon which it is growing. In a typical construction for the serrations of the fingers 44 and 46, it has been found that a good operation is achieved when the stationary arms 44 include serrations having individual contours formed on a circle radius of one inch with only three-quarters of an inch of the circle segment being cut into the bottom edge of the individual fingers. Such contour dimensions for the stationary fingers 44 may be spaced five-eights of an inch from one another along the lower edges of the fingers. Suitable dimensions for the vibrating fingers 46 may include serration contours 59 formed on a one and three-quarter inch circle radius with only one and one-half inches of the circle segment being cut into the bottom edges of the fingers. Such contour dimensions for the vibrating fingers 46 may be spaced one and three quarter inches from one another along the longitudinal axis of the fingers 46. With such constructions for the adjoining fingers 44 and 46, it has been found that citrus fruit is usually easily snapped off from its stems, and the variations in the serration contours of adjoining fingers simulate the rotating movements of manual picking wherein a fruit is twisted back and forth for short distances on its stem axis. A typical construction for the set of fingers 16 also contemplates a relatively close spacing of the fingers from one another, and it has been found that a spacing of approximately one and one fourth inches between fingers is desirable. As is shown in FIGURE 2, the individual fingers are tapered from their bases to their terminal ends, and typical dimensions include a two inch height at the base end of the finger and a three-quarter inch height at an outer end of the same finger. The individual fingers may be approximately one-half inch thick and twenty-two inches long, and with the relatively high frequency vibrations which are utilized in the present invention, it is possible to form the fingers from metal stock without any danger of damaging a fruit crop harvested with them.

Turning now to the means for vibrating the fingers 46 in vertical planes, reference will be made to FIGURE 4 as viewed in combination with FIGURES 2 and 3. The plurality of fingers 16 are mounted at base ends which are either fixed or movable relative to the housing 36, as already discussed. The stationary fingers 44 are longer than the fingers 46 and are long enough to be supported in a fixed relationship to the housing 36 by two spaced mounting shafts 60 and 62. The mounting shafts 60 and 62 are positioned within the housing by upright bracket members 64 which are welded or otherwise affixed to a floor section of the housing. Thus, the fingers 44 extend into the housing and are supported by two separate support shafts 60 and 62, and no movement of the fingers 44 relative to the housing is possible. On the other hand, the fingers 46 are shorter in length and are supported by only the shaft 60 so that they may vertically vibrate up and down about an axis determined by the shaft 60. The fingers 46 are vibrated by the operation of actuating arms 65 connected to each one of the fingers 46. The actuating arms 65 are driven by a cam means so as to rock about the horizontal axis of the support shaft 62. A cam shaft 66 may be driven to rotate a cam 68 in each of the actuating arms 65, and in this manner, the actuating arms are caused to rock up and down and to relay a vertical vibratory movement to the fingers 46. A motor means 70 of any known construction (such as an electric motor means) is mounted within the housing 36 to drive the cam shaft 66 and its associated cams 68. It has been found that a one-half horsepower electric motor of 3450 r.p.m. may be utilized to drive the cam shaft 66 by a chain or belt drive 72. Of course, it is apparent that bearing members are provided at necessary places on the cam shaft, and bearing members may be used to space adjoining fingers from one another for the requisite spacing and to provide for relative movement of the fingers. The connection between the actuating arms 65 and the vibrating fingers 46 is shown in the form of elongate openings 73 formed through the overlapping segments of the arms 65 and the fingers 46, and a pin 74 maintains the connection between the two members. The elongate opening 73 permits a relative adjustment of the two members during the application of vibratory vertical movements thereto. With the arrangement just described, it is possible to move the arms 46 vertically for distances of one and one-half inches at their outer extremities and at a frequency of 3000 times per minute.

In addition to the vertical vibration which can be applied to selected fingers of the set 16, the entire set of fingers is also vibrated in a horizontal plane. It has been found that when the fingers 46 are being vertically vibrated at a frequency of 3000 times per minute, it is desirable to horizontally vibrate the entire set of fingers at approximately 3450 times per minute with the outer extremities of all fingers vibrating for a distance of oneeighth inch in a horizontal plane. The means for applying horizontal vibratory movements to the entire set of fingers will be described with reference to FIGURE 5 as viewed in connection with FIGURE 2. Horizontal vibratory movements are applied to the entire housing 36 and ultimately to all of the fingers of the set 16 by a separate motor means 80 which is mounted in the housing as shown in FIGURE 2. A drive shaft from the motor means extends downwardly through a bottom floor of the housing and drives a cam 84 which rotates relative to a driving plate 86. The driving plate 86 is connected to the housing 36, and therefore, the eccentric movements of the cam 84 are imparted back to the housing 36. The housing is journaled in a bearing at 88 to pivot about a central vertical axis through the bearing 88. A mounting bolt 90 may be provided for fixing the pivotal axis of the housing relative to the plate 86. Of course, it is understood that the vibrations are of a very high frequency and for a very limited distance back and forth, and therefore, the brackets 52 and the ram means 20 may be mounted to flex slightly in a horizontal plane relative to the boom and collecting trough structure associated with the harvesting unit 10. Also, it should be noted that the plate 86 is not connected to the support platform 12, and thus, when the ram 20 is extended, the plate 86 follows the tilting movements of the housing 36.

Although the vibratory movements have been described with reference to specific vibration frequencies and specific distances for vibrating the terminal ends of the fingers 44 and 46, it is to be understood that variations in these frequencies and distances are contemplated. For example, it is possible to adjust the frequency of vibrations for both the horizontal and vertical vibratory movements within a reasonable range above or below the selected frequencies which are described. Likewise, it is possible to vibrate the fingers for greater or lesser distances at their terminal ends, depending upon the type of fruit being harvested.

FIGURES 6 and 7 illustrate an alternative form of collecting means which may be used with the harvesting unit 10 described above. The collecting means of FIGURES 6 and 7 is best adapted for insertion into a tree which includes thick foliage or a great number of branches which would otherwise impede the movement of a collecting pan 48 of the type described in FIGURE 2. The collecting means of FIGURES 6 and 7 includes a plurality of fingers 92 which are closely spaced together so as to receive and contain any fruit which falls downwardly from the vibrating fingers of the harvesting unit 10. The collecting means is adapted to be carried directly beneath the harvesting unit 10, and as shown in FIGURE 7 a support block 38 and brackets 52 are provided for connection to the harvesting unit 10, just as described for the embodiment of FIGURE 2. The fingers 92 may be greater in number than the number of fingers contained on the harvesting unit 10, and the fingers 92 may be coated with rubber or a synthetic plastic material to avoid any damage to fruit which falls into the illustrated collecting means. Each of the fingers 92 is curved upwardly at its outer end as shown in FIGURE 7, however, two separate finger constructions 94 are provided on the margins of the collecting unit so as to prevent the loss of any collected fruit over the sides of the unit.

Having described the constructional features of this invention, it is apparent that a novel and useful apparatus is provided for effectively removing a ripe citrus fruit crop from trees. The novel apparatus provides for a quick and safe removal of fruit without damage to the fruit or to the tree, and the removal is accomplished by relatively high frequency vibrations and reciprocatory movements being applied to the fruit contacted by the apparatus. Although the harvesting unit has been described in conjunction with a collecting means which may be used to receive and convey the removed fruit to a collecting receptacle, it is to be understood that the harvesting unit may be used separately and by itself at the end of a boom. In citrus fruit harvesting operations, it is known to permit fruit to fall to the ground or to collecting screens which may be placed at the ground level, and in such operations it would not be necessary to include a separate collecting means on the apparatus which is removing the fruit from the tree. Variations in the above described apparatus will become obvious to those skilled in the art, and such variations and modifications are intended to be included within the scope of this invention. Likewise, it will be apparent that the above described apparatus and the principles incorporated therein, may be adapted to the harvesting of other fruit crops, and the invention is not limited to the citrus industry.

What is claimed is:

1. A harvesting unit for removing citrus fruit from citrus trees comprising:

a plurality of finger means for contacting upper surfaces of citrus fruit which is to be removed from a tree and for imparting gentle vibrations thereto, said fingers being spaced from one another in parallel positions so that more than one finger contacts an individual fruit which is contacted by said harvesting unit, said finger means having lower edges for contacting fruit, said lower edges being scalloped to provide fruit-receiving indentations along the lengths of the fingers, each of said indentations being of a size and configuration to receive the upper curved surface of an individual fruit, and means operatively connected to said finger means for vibrating at least alternate fingers of said plurality of finger means, whereby an individual fruit is gently vibrated downwardly away from its stem and removed from its stem by the vibrations applied thereto.

2. The harvesting unit of claim 1 wherein said means for vibrating said fingers includes means for vibrating the fingers in a vertical plane.

3. The harvesting unit of claim 2 wherein alternate fingers are vibrated vertically.

4. The harvesting unit of claim 3 wherein said alternate fingers are vibrated in a frequency range of 1,000 to 5,000 vibrations per minute.

5. The harvesting unit of claim 2 and including means for laterally vibrating the plurality of fingers.

6. The harvesting unit of claim 5 wherein said fingers are vibrated laterally with a frequency range of 1,000 to 5,000 vibrations per minute.

7. An apparatus for harvesting fruit from trees, comprising:

a set of closely spaced finger means which can be extended longitudinally on a horizontal plane into a tree, a number of said fingers of said set being maintained vertically stationary relative to the apparatus and to other fingers comprising said set, and power means operatively connected to said set of fingers for imparting lateral horizontal vibrations to the entire set of fingers and for imparting vertical vibrations to only said other fingers of said set.

8. The apparatus of claim 7 and including:

support means for said apparatus so that the apparatus can be extended into a fruit tree to be harvested, and means connected to said support means for receiving the harvested fruit said last-named means being located below said set of fingers, so that the harvested fruit can be recovered.

9. The apparatus of claim 8 wherein said receiving means consists of a plurality of arms located below said finger means, so that the receiving means can be extended within the fruit tree to receive the harvested fruit.

10. The apparatus of claim 7 wherein said other fingers which are vertically vibrated are alternate fingers in said set, each of said fingers of said set being spaced closely enough to adjoining fingers to cause more than one finger of said set to contact a single ripe fruit, and each of said fingers further including a serrated lower edge for receiving and engaging upper surfaces of fruit, whereby a ripe fruit is contacted by at least one vertically vibrating finger and at least one stationary finger and is gently vibrated back and forth about a horizontal axis at the base of its stem until it is caused to fall away from its stem.

11. An apparatus as in claim 10 wherein each of said fingers which is being vertically vibrated has a serrated lower edge wherein the radii of the serrations differ from the serration radii of said fingers which remain stationary relative to the number of fingers which are vertically vibrated, whereby the fruit being contacted by said lower serrated edges is rapidly reciprocated about its stem and is caused to drop away from its stem.

12. An apparatus as in claim 7 wherein said power means comprises a first and a second motor means being independently operated, a first offset cam shaft, the first motor means imparting a lateral movement to all of the finger means of said set through said first offset cam shaft, a second offset cam shaft, the second motor means imparting vertical movement to a number of said fingers of said set through said second offset cam shaft to which are connected a set of actuating arms equal in number to the fingers being vertically vibrated, so that the vertical and horizontal movement can be effectively imparted to the fingers extending into the tree.

References Cited

UNITED STATES PATENTS

| | | | |
|---|---|---|---|
| 2,671,301 | 3/1954 | Harrison | 56—330 |
| 3,077,720 | 2/1963 | Grove et al. | 56—328 |
| 3,245,211 | 4/1966 | Weygandt et al. | 56—330 |
| 3,401,514 | 9/1968 | Clark | 56—328 |

RUSSELL R. KINSEY, Primary Examiner